United States Patent [19]
Pollock et al.

[11] Patent Number: 6,037,740
[45] Date of Patent: Mar. 14, 2000

[54] SWITCHED RELUCTANCE ELECTRIC MACHINE SYSTEM

[75] Inventors: Charles Pollock, Coventry; Mike Barnes, Manchester, both of United Kingdom

[73] Assignee: The University of Warwick, Coventry, United Kingdom

[21] Appl. No.: 08/981,465
[22] PCT Filed: Jul. 4, 1996
[86] PCT No.: PCT/GB96/01597
§ 371 Date: Feb. 23, 1998
§ 102(e) Date: Feb. 23, 1998
[87] PCT Pub. No.: WO97/02649
PCT Pub. Date: Jan. 23, 1997

[30] Foreign Application Priority Data
Jul. 5, 1995 [GB] United Kingdom ............ 9513662

[51] Int. Cl.⁷ ...................................... H02P 1/46
[52] U.S. Cl. .................. 318/701; 318/254; 318/138; 318/439; 318/561
[58] Field of Search ............................. 318/701, 254, 318/138, 439, 561

[56] References Cited
U.S. PATENT DOCUMENTS 3,956,678  5/1976  Byrne et al. .
4,348,619  9/1982  Ray et al. .
4,550,280  10/1985  Freise et al. .
4,707,650  11/1987  Bose ............................. 318/254
5,412,268  5/1995  Arnaud et al. .
5,548,196  8/1996  Lim ............................. 318/701
5,844,343  12/1998  Horst ............................ 318/701

*Primary Examiner*—Karen Masih
*Attorney, Agent, or Firm*—Leydig, Voit & Mayer, Ltd.

[57] ABSTRACT

A switched reluctance electrical machine system including a switched reluctance machine, a rechargeable DC energy store and principle voltage terminals connectable to an external power source. The switched reluctance machine comprises a rotor, a stator and windings wherein the windings include at least two closely-coupled coils and a power converter for controlling current flow in the windings. The power converter has first and second circuits. The first circuit contains one of the closely-coupled coils and the principle voltage terminals while the second circuit contains the other of the closely-coupled coils and the energy store. A first switching arrangement is connected in series with the coils in the first circuit and a second switching arrangement is connected in series with the coils in the second circuit. An electronic controller controls the switching arrangements so that, in a first operational mode, current flows in one direction in the coils during normal machine operation and, in a second operational mode, current flows in the coils in the opposite direction to charge the energy store from an external power source.

24 Claims, 3 Drawing Sheets

SWITCHED RELUCTANCE ELECTRIC MACHINE SYSTEM

This invention relates to a switched reluctance electric machine system including an electric machine, a rechargeable DC energy store, principal voltage terminals and a controller.

In such a system the electric machine may be designed primarily to act as a motor or a generator. Where it is a motor, it is advantageous to drive the motor from a rechargeable energy store, so that the motor does not always need to be connected to an AC supply for operation, as this restricts the portability of the appliance powered by the motor. In such motor systems the energy store (normally a battery) is usually recharged from an AC supply using a charger including a transformer operating from the AC supply to step down the voltage, and means for rectifying and smoothing the supply before charging the energy store. Such a charger, although simple, is bulky and heavy, as the transformer is a relatively large electromagnetic device. Recent chargers based on switched mode power supply technology use power electronic switching circuits to provide a controllable DC output to the energy store from the AC input. These chargers are smaller than those using transformers, but are more expensive. Thus, incorporating a charger into an electric machine system increases the size or the cost of the system and the appliance in which the system is incorporated. However, including a charger may have the advantage that if the energy store is fully discharged, the motor can still be operated if the charger is connected, as this can provide an equivalent DC voltage.

GB 1 604 066 shows a system in which a charger is formed by utilising existing components. Here the power converter circuit, which controls current flow from the battery to pairs of closely-coupled motor windings to operate the motor, is also used to control current flow from a rectified AC supply to pairs of closely-coupled motor windings, which operate as an isolating transformer, isolating the battery from the rectified AC supply when on charge. For charging, the power converter circuit operates to build up current in a main winding of a pair, the current then being transferred to an auxiliary winding of the pair and from there to the battery. Electromechanical contactors must be operated after charging to enable the battery to drive the motor, again using the main windings. The system therefore incorporates a charger by using existing components. However, it does not allow the motor to be operated from the rectified AC supply, and it requires operation of the electromechanical contactors after charging for motor operation. Furthermore, it is only suitable for applications where the voltage of the rectified AC supply and the battery are similar.

U.S. Pat. No. 5,412,268 shows a system in which an electric motor operates a vehicle from a battery, current flow through the motor stator windings being controlled by diodes and switches. The system is also able to operate in a brake generator mode, to charge the battery, and to charge the battery from an AC supply. The charger is formed by using the stator windings, which are re-configured into a transformer. The rotor winding is also disconnected. For charging, current flows in the opposite direction through the windings, again controlled by the diodes and switches. Electromechanical contactors are operated to perform the re-configuration, through several contacts. Although the charger utilises existing components, the motor cannot be operated from the AC supply, and the system must be manually switched between charging and motoring modes.

According to the present invention, a switched reluctance electric machine system has a switched reluctance machine including a rotor, a stator and windings including at least two closely-coupled coils, a rechargeable DC energy store, principal voltage terminals, a power converter for controlling current flow in the machine windings during operation of the machine, the power converter having a first circuit containing a first of the closely-coupled coils and the principal voltage terminals and a second circuit containing a second of the coils and the energy store, the first and second circuits each including an electronic switching arrangement connected in series with the coil, to enable current to flow through each coil in either direction, and an electronic controller for operating the electronic switching arrangements of the power converter to provide any required operational mode, without mechanical re-configuration of the system.

If the first and second coils have different numbers of turns, they can operate at substantially different voltages. The coils can therefore act as a transformer to match the voltage of the principal voltage terminals to the voltage of the DC energy store. This allows these voltages to be substantially different, and the machine to operate with the principal voltage or the DC energy store. The power converter may then have separate high and low voltage circuits and the electrical components in each can be rated accordingly, so making the power converter more efficient.

The system is simple in construction and operation, because additional contactors for switching between operational modes are not required. Instead the electronic controller simply operates the electronic switching arrangements to provide the modes, current flow through each coil in each direction being allowed by the electronic switching arrangement.

Each electronic switching arrangement preferably comprises a s witch and diode arranged in anti-parallel. Alternatively, each may comprise a MOSFET in which a switch and diode are integrated. Other switching arrangements could be used, provided that they allow uncontrolled flow of current in one direction, and controlled flow in the other direction.

One or both circuits may also include a further switch and diode arranged in anti-parallel and then connected in series with the coil. Two further diodes may then be included.

The closely-coupled coils may include a t least one further coil, and the power converter has a corresponding further circuit containing the further coil a nd a further DC energy store and/or DC load.

Where there are two closely-coupled coils, these are preferably a bifilar winding, where both coils are wound co-axially on the same poles of the machine. The coil with the lower number of turns may be wound as several coils which are connected in parallel. The machine may have more than one such pair of coils and conventional windings as well. Additional pairs may have similar power converters, or conventional power converters. A phase winding may comprise multiple sets of coils on multiple poles but still require only one power converter.

The electronic controller preferably operates in response to signals from various sensing means. Thus, a rotor position sensing means may be used when the machine is rotating. A current sensing means may also be incorporated, to determine when chopping is required. Chopping is when at least one switch of the power converter is opened and closed rapidly, to limit the current supplied.

Allowing for current to flow in either direction through each coil of the closely-coupled pair gives the system flexibility. The machine may act as a motor, in which case a principal voltage supply is connected to the principal voltage terminals. In a motor system, the first circuit preferably includes the principal voltage supply terminals, and means for providing the principal voltage supply from an AC supply, for example in the form of a bridge rectifier and a smoothing capacitor.

The second circuit may include a filter to smooth the current into and out of the DC energy store. This store may conveniently be a battery.

The motor can be driven from the principal voltage supply, or from the DC energy store or from both. Further, charging the DC energy store from the principal voltage supply may be done while the rotor-is being driven from that supply as well as when it is stationary. When the motor is operating from the principal voltage supply and/or charging the DC energy store, current flows in one direction through the coils, and when the motor is driven from the DC energy store, current may flow in the other direction. The system can also provide regenerative braking, that is, when the motor slows down, or when it is driven by a source of mechanical energy, it converts mechanical energy into electrical energy which is stored in the DC energy store. The controller may provide automatic changeover between driving the motor from the battery and from the principal voltage supply on connection and disconnection of the AC supply.

The system also has the advantage of being able to provide for uninterrupted operation of the motor on failure of the principal voltage supply, as the DC energy store will be charged while the motor is driven from the principal voltage supply, and on failure of that supply the controller will automatically bring the DC energy store in to operate the motor. This is particularly useful for such applications as central heating pumps and fans.

Further, for regenerative braking, the system does not need the principal voltage supply to be connected. Regenerative braking would be useful for applications such as lawnmowers where, for safety reasons, the motor must be brought to rest rapidly when the principal voltage supply is disconnected. It would also be useful for electric bicycles and wheelchairs, in order to minimise the amount of charging needed by the DC energy store. In such systems, the machine system may be required to run for relatively long periods as a generator, with the mechanical energy being transformed into electrical energy stored in the DC energy store.

In fact, in other systems the machine may act primarily as a generator, in which case the principal voltage terminals are for a principal voltage output.

In a generator system, the first circuit may include the principal voltage output terminals. The DC energy store is preferably a battery.

The generator may operate from a mechanical energy source to supply the principal voltage output, or the DC energy store, or both. The principal voltage output may be supplied from the DC energy store, or from the DC energy store and the mechanical energy source. The machine system may also operate as a motor, driven from the DC energy store, while providing a DC output at the principal voltage terminals.

Some embodiments of the invention are illustrated, by way of example, in the accompanying drawings, in which.

Figure 1:
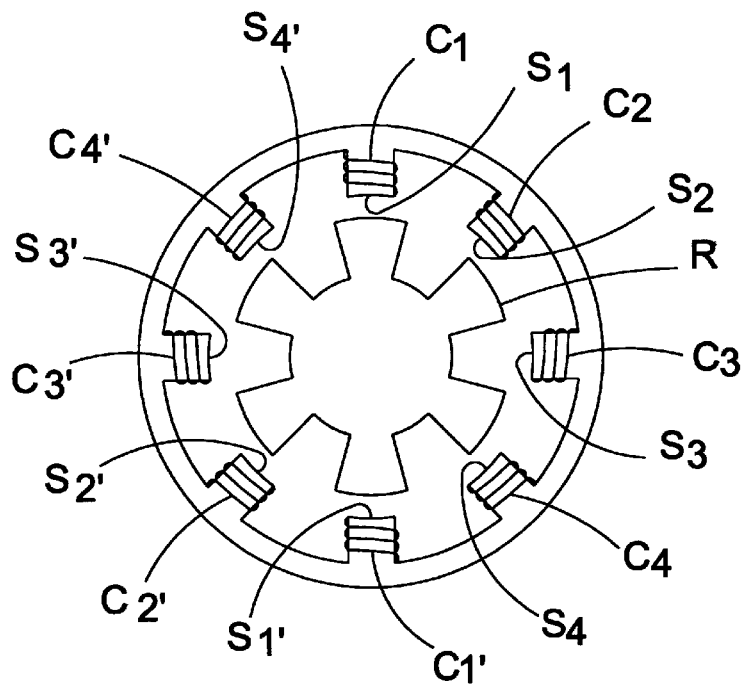
FIG. 1 is a schematic view perpendicular to the axis of rotation of a switched reluctance machine.

The switched reluctance machine represented in FIG. 1 is a typical four-phase switched reluctance machine with eight stator poles S1, S1' to S4, S4' and six rotor poles R. A respective coil winding C1, C1' to C4, C4' is wound around each stator pole S1, S1' to S4, S4', each winding being connected in series or parallel with the winding on the diametrically opposite stator pole. Thus, coils C1 and C1' are connected in series or parallel, as are C2 and C2', and so forth. Each two series-or parallel-connected coils Cn, Cn' together form a phase winding.

The reluctance of the magnetic flux path between two diametrically opposite stator poles Sn, Sn' varies as a pair of rotor poles R rotates into and out of alignment with them. If current flows in a phase winding Cn, Cn' while the rotor is turning electromechanical energy conversion occurs. The salient pole rotor is attracted towards an aligned position where it provides a path of minimum reluctance for the stator flux associated with that phase winding. If current is applied to the phase winding in advance of the aligned position, torque is produced which will tend to maintain that direction of rotation. If current is applied to the phase winding after the rotor has passed the aligned position, the torque will be in the opposite direction to the direction of rotation. The timing and magnitude of the current applied to the winding determines the torque of the machine. The current is controlled by a power converter, shown in FIG. 2.

Figure 2:
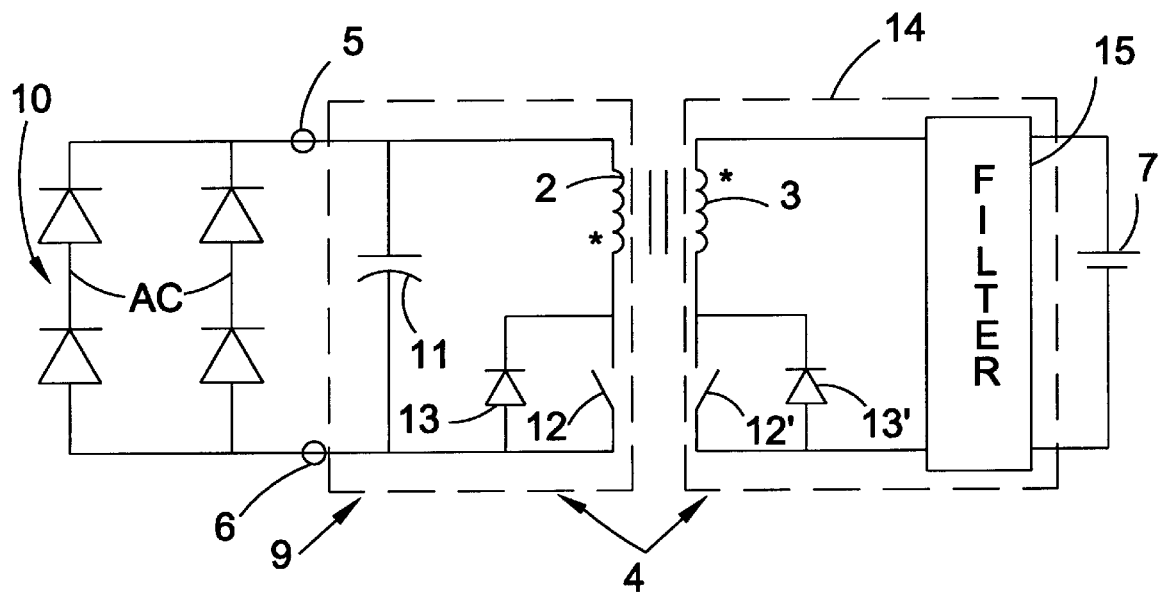
FIG. 2 is a circuit diagram of one phase of a switched reluctance machine driven from a principal voltage supply or a DC energy store.

FIG. 2 shows one phase winding Cn, Cn' of the switched reluctance machine. The phase winding 1 comprises first and second coils 2, 3 driven by a power converter 4 from principal voltage supply terminals 5, 6 or a rechargeable DC energy store in the form of a battery 7. The battery 7 can also be charged from the principal voltage supply.

The coils 2, 3 are in the form of a bifilar winding, and so are closely-coupled and wound co-axially round a set of poles 8 of the motor. The first coil 2 is in a first circuit 9 of the power converter 4 with the principal voltage supply terminals 5, 6 which are supplied from a mains (AC) supply by a bridge rectifier 10 and a smoothing capacitor 11. This prevents any power returning to the AC supply. An electronic switching arrangement comprising a switch 12 and anti-parallel diode 13 connected to the coil 2 completes the first circuit 9.

The second coil 3 is in a second circuit 14 of the power converter 4 with the battery 7 and a filter 15, which could be of any suitable type, such as an LC filter. The second coil 3 has an electronic switching arrangement of a switch 12' and anti-parallel freewheel diode 13' corresponding to those of the first coil 2.

The first and second coils 2, 3 have different numbers of turns, the ratio of the turns helping to match the voltage ratio between the principal voltage (mains) supply and the battery. The first circuit 9 is therefore at a higher voltage than the second circuit 14, and the two circuits are electrically separate. The phase winding 1 is excited by current flowing in either of the coils 2, 3 and exerts a torque on the rotor tending to pull it towards alignment with a set of stator poles. The switches 12, 12' control the current flow in the power converter 4. The switches 12, 12' are controlled by an electronic controller (not shown) in response to sensing means (not shown) to determine the operating mode. However, current only flows in one coil at a time, so the switches 12, 12' never conduct simultaneously.

The power converter 4 has several modes of operation. In a first mode, the rotor of the machine is stationary and the battery 7 is charged from the principal voltage supply. For this, the switch 12' is open (non-conducting), and the switch 12 is chopped, that is, opened and closed rapidly. When the switch 12 is closed (conducting), a positive voltage is applied to the coil 2, and current flows through it, increasing the magnetic flux linking phase 1. The pair of coils 2, 3 are wound such that when a positive voltage is applied to coil 2, a voltage is induced in coil 3 which reverse biases the diode 13', preventing current flow in coil 3. When the switch 12 opens, the voltage across the coils 2, 3 reverses and the current flows in the coil 3, transferring some or all of the energy stored in the magnetic field through the diode 13' to the battery 7. The filter 15 improves the current profile flowing into the battery. The power converter 4 therefore operates as a flyback converter transferring the energy from the principal voltage supply to the battery 7. The coils 2, 3 act as a flyback transformer. The rotor will remain stationary near to an aligned position provided that the magnetic flux in the phase 1 does not drop to zero and the chopping frequency is higher than any mechanical resonant frequency of the rotor.

In a second mode of operation, the machine is operated as a motor from the principal voltage supply and the battery is trickle charged. For this, switch 12' is open, and switch 12 is opened and closed, but this time controlled by rotor position sensing means so that the rotor is rotated. Thus, when the switch 12 is closed, current flows through the coil 2, producing a magnetic flux linking the phase winding 1 and exerts a torque on the rotor, causing it to rotate. When the switch 12 opens, the voltage across the phase winding 1 reverses, and some of the remaining energy stored in the magnetic field is transferred to the battery 7 by the coil 3 and the filter 15. The battery 7 is therefore trickle charged while the motor is operating from the principal voltage supply. If the motor is operated at low speed, it may be necessary to chop the switch 12, in order to maintain the voltage and current at a given average level, to ensure proper operation of the motor.

In a third mode of operation, the motor is operated from the battery 7. For this, the switch 12 is open, and the switch 12' is opened and closed under the control of the rotor position sensing means. When the switch 12' is closed, current flows through the coil 3 to operate the motor, and when it opens the voltage across the phase winding 1 reverses, and current flows in the coil 2, transferring the remaining energy stored in the magnetic field to the capacitor 11. Again, the switch 12' may need to be chopped to ensure proper operation of the motor particularly at low speeds. It will be appreciated that the direction of current flow in the coils 2,3 in this mode is opposite to that occurring in the first and second modes. It will also be appreciated that the energy in the capacitor 11 must periodically be used to operate the motor to ensure that the capacitor 11 does not become overcharged. The electronic controller must therefore be arranged to accommodate this. It is preferable to maintain the voltage on capacitor 11 to be approximately equal to the product of turns ratio and battery voltage.

In a fourth mode of operation, the motor is operated from both the principal voltage supply and the battery 7 to achieve near unity power factor operation. If power is drawn from both the principal voltage supply and the battery, it is possible to ensure that the current drawn from the principal voltage supply is approximately sinusoidal. This mode of operation will be best at higher motor speeds.

In a fifth mode of operation, the machine is operated to provide regenerative braking, or continuous generation, so that as the rotor slows down, or while it is driven by a mechanical energy source, mechanical energy is transferred into electrical energy which is stored in the battery. For this, it is necessary to apply current to a phase winding as the rotor poles are moving away from the aligned position. Thus, initial current flow is established by closing a switch, say 12. Once a small current is established the switch 12 is opened and current will continue to flow through the coil 3 and the diode 13' into the battery 7. For generation into the battery 7 there must be an initial voltage across the capacitor 11 to establish the initial current. If the principal voltage supply is connected, this will provide the voltage. If it is not connected, switch 12' is operated to charge the capacitor 11 via diode 13. Generation then takes place using switch 12 and diode 13'. The capacitor 11 may occasionally need to be recharged by reversing the current flow in the winding, using switch 12' and diode 13, during one or more generating cycles.

The invention thus allows the machine system to operate as a motor from the principal voltage supply and from the battery, as well as allowing the battery to be charged from the principal voltage supply with the rotor stationary or rotating. The turns ratio of the coils 2, 3 means that the phase 1 acts as a transformer (in this case a step-down transformer) during charging. Regenerative braking or generation for longer periods is also possible. A further advantage is that the power converter 4 has electrically separate high and low voltage sides (the first circuit 9 and second circuit 14 respectively) so that the components of each can be rated accordingly.

The electronic controller will normally be microprocessor-based, and will control operation of the power converter 4 in accordance with signals from sensing means (not shown). As well as the rotor position sensing means, it may be advantageous to include a voltage sensing means to determine the voltage on the capacitor 11. If a threshold voltage is exceeded during operation of the motor from the battery, the controller operates the motor from the capacitor 11 to ensure that it does not become overcharged.

The controller can be arranged to switch between operating modes automatically, so that for example on disconnection of the mains supply the motor can continue operating from the battery. The battery will normally be at least partially charged, because of the trickle charging mode of operation, so that the motor has a continuous energy source on disconnection of the mains supply.

Figure 3:
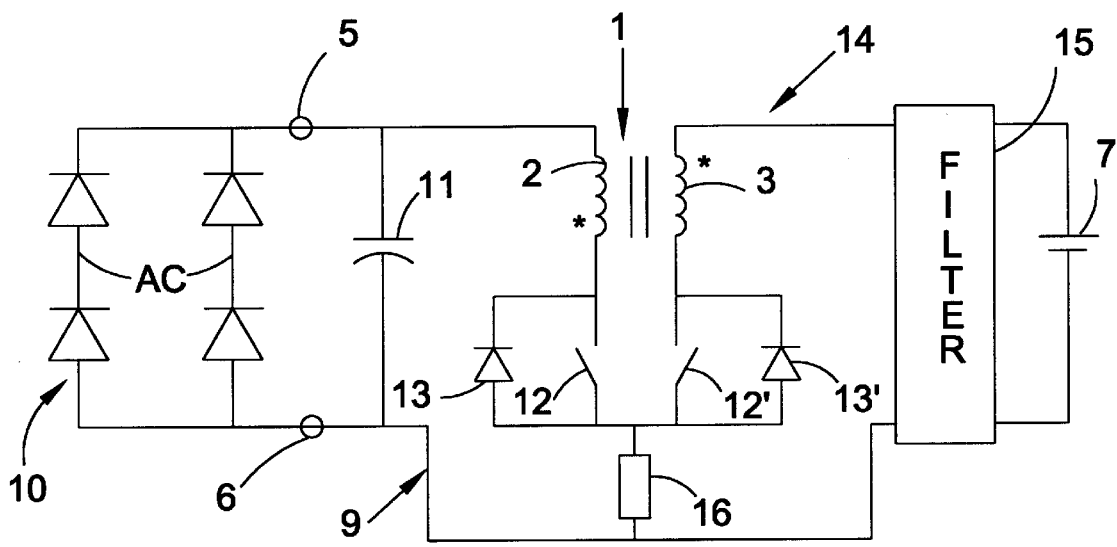
FIG. 3 is a modification of the circuit of FIG. 2.

A modified circuit is shown in FIG. 3, in which a current sensor 16 is incorporated. The sensor 16 is in the form of a current sensing resistor, to sense the current in each coil 2, 3. Other suitable sensors may be used as appropriate. The sensor is used to signal when chopping is required at low motor speeds. It may also provide information during battery charging. The remainder of the construction and operation of the circuit of FIG. 3 corresponds to that of FIG. 2 and corresponding reference numerals have been applied to corresponding parts. This circuit does not isolate the circuits 9 and 14, but operation of the circuits is not affected. The connection of the circuits 9 and 14 in this way enables the power switch gate drivers to be referenced to a single voltage node.

Figure 4:
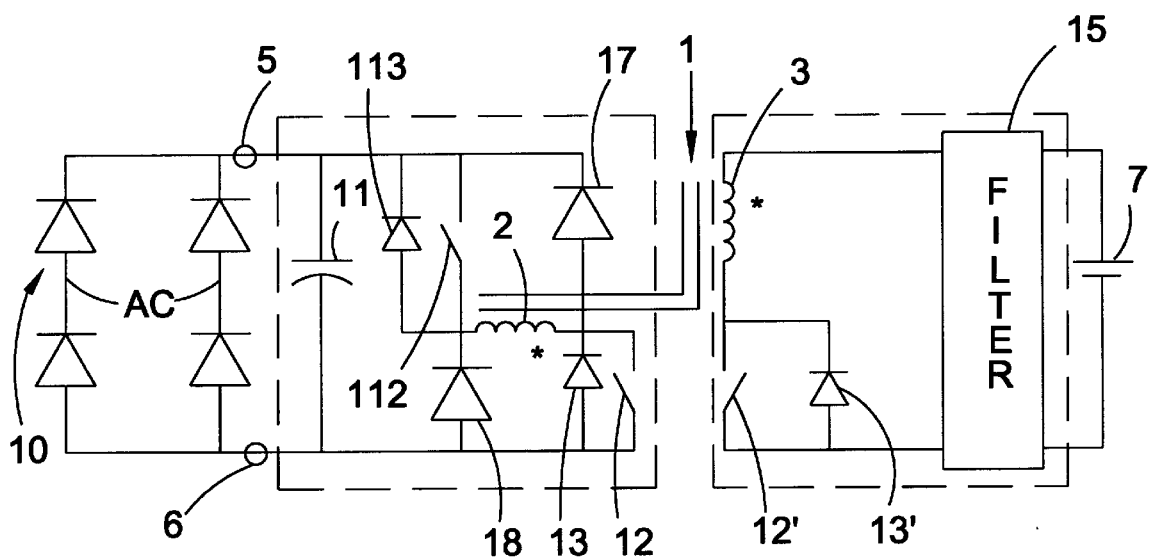
FIG. 4 is a diagram of a further circuit.

FIG. 4 shows a further modified circuit, and corresponding reference numerals have been applied to corresponding parts. The second circuit 14 is the same as that of FIG. 1, but the first circuit 9 includes a second switch 112 and second diode 113 arranged in anti-parallel, and connected in series with the coil 2. Two further diodes 17, 18 are connected between the coil 2 and the voltage supply. This arrangement is known as an asymmetric half bridge, and is particularly advantageous at high power. It provides additional flexibility if current chopping is needed when the motor is operating from the principal voltage supply.

In operation, if the switches 12 and 112 are switched simultaneously the system operates as described in relation to FIG. 1. However, if the rate of rise of current needs limiting, one of these switches 12, 112 is opened and closed to provide chopping. When one switch, say 12, is opened the current in coil 2 will circulate via diode 17 and switch 112 without transferring energy to the battery. When both switches 12, 112 are open, the energy stored in magnetic field transfers to the battery 7, providing the voltage on capacitor 11 is sufficiently high. Any energy stored in the magnetic field which is not coupled to coil 3 can transfer to the capacitor 11 through the diodes 17, 18.

When the motor is driven from the battery 7, the switch 12' is operated as before. At the end of each torque-producing pulse, the switch 12' is opened, and the current transfers to coil 2, flowing through diodes 13 and 113 as before.

The asymmetric half bridge circuit, shown in circuit 9 of FIG. 4 could be used in circuit 14 instead.

Figure 5:
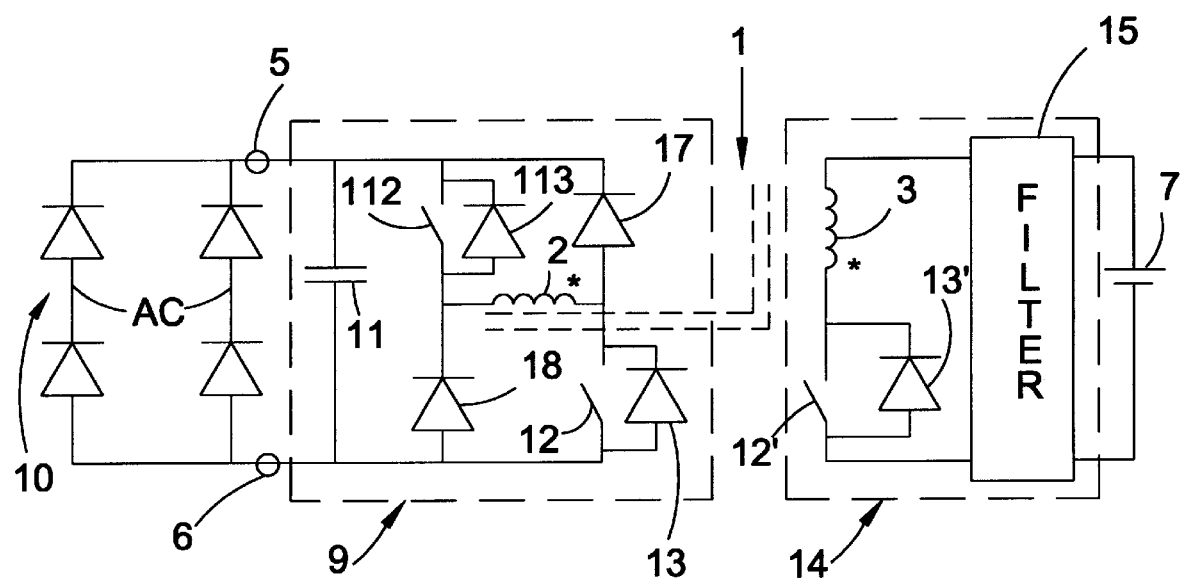
FIG. 5 is a diagram of another circuit.

FIG. 5 shows a further embodiment, similar in construction to FIG. 4, except that the polarity of the coil 3 is reversed. This reverses the voltage across the coil 3, and means that the pair of coils 2, 3 is wound as a forward transformer. When a positive voltage is applied to the coil 2 (by closing switches 12, 112) a charging voltage is applied to the battery 7. This embodiment makes it possible to charge the battery 7 while the switches 12 and 112 are closed, as well as when they are open. In the previous embodiments, battery charging only occurred when the switches 12 and 112 were open, with current flowing in the circuit 14, and was prevented otherwise.

As with the previous embodiments, the converter 4 has several modes of operation. In the first mode, the rotor of the machine is stationary and the battery 7 is charged from the principal voltage supply. For this, the switch 12' is open (non-conducting), and the switches 12 and 112 are closed. This applies a positive voltage across coil 2, in which current builds up. The voltage across coil 2 applies a charging voltage to the battery 7, in the direction that causes current to flow into the battery 7 through the diode 13'. As the current in coil 3 increases, so does the terminal voltage on the battery 7. The current in coil 3 increases until the battery terminal voltage is equal and opposite to the charging voltage. The peak charging current is limited by the voltage on the battery terminals. The current in the coils 2, 3 may also be limited by chopping switch 12 and/or switch 112. If switch 112 is chopped, current in the coil 2 freewheels through switch 12 and diode 18 while switch 112 is open, and current in the coil 3 freewheels through the battery 7 and diode 13', reducing the current. If both switches 12 and 112 are open with current flowing in coil 2, the current in coil 2 freewheels via diodes 17 and 18, and the current in coil 3 flows through diode 13' to the battery 7. As can be seen, battery charging is possible while the switches 12 and 112 are open or closed.

In the second mode of operation, the machine is operated as a motor from the principal voltage supply, and the battery 7 is trickle charged. For this, switch 12' is open, and switches 12 and 112 are opened and closed in response to the rotor position sensing means. The switches 12 and 112 are chopped if necessary to limit the current in the coils 2 and 3. When the switches 12 and 112 are closed the current in the coil 2 rises, as before. Current flows in the coil 3 to charge the battery 7, and the battery terminal voltage rises until it is equal and opposite to the charging voltage. Torque is exerted on the rotor, which rotates. When the switches 12 and 112 open, current in the coil 2 freewheels through diodes 17 and 18 to the capacitor 11, and current in the coil 3 flows through diode 13' to charge the battery 7. The battery 7 is therefore trickle charged. However, operating the motor from the principal voltage supply when the battery 7 is not fully charged will reduce the torque of the motor, as the battery 7 is taking torque-producing current.

In the third mode of operation the machine is operated as a motor from the battery 7. For this, the switches 12 and 112 are open, and the switch 12' is opened and closed based on information on the rotor position and current. When the switch 12' is closed, current builds up in the coil 3 and operates the rotor. Current also flows in the coil 2, and through diodes 13 and 113 to the capacitor 11, until the voltage across the capacitor 11 exceeds the referred battery voltage. The current in the coil 2 decays to zero. At the end of the motoring stroke, switch 12' is opened, and the current in the circuit 9 freewheels through diodes 17, 18 into the capacitor 11. Capacitor 11 must therefore be periodically discharged by a motoring stroke of the second mode of operation.

Fourth and fifth modes of operation are possible to achieve near unity power factor operation, and to provide regenerative braking.

The asymmetric half bridge circuit, shown in circuit 9 of FIG. 5 could be used in circuit 14 instead. Alternatively, both circuits 9, 14 could be asymmetric half bridges.

To take into account all the modes of operation, the turns ratio N of the coils 2, 3 and the capacitance of the capacitor 11 should ideally be chosen so that $$V_c/V_{bd} < N < V_c/V_{bd}$$

where $V_c$ is the voltage on capacitor 11 when the principal voltage supply is connected, $V_{bd}$ is the battery terminal voltage during discharge and $V_{bc}$ is the battery terminal voltage during charge. This ensures that the voltage on the battery 7 is automatically limited during charging and that when the motor is operated from the battery 7, the voltage $V_c$ on the capacitor 11 does not reach an excessive value before it prevents the forward transformer action.

The invention has been described in relation to a single phase 1 of a switched reluctance machine system, and further phases may have similar power converters 4, or conventional power converters on the high or low voltage side. Switched reluctance machine systems with any number of phases may therefore also benefit from the invention.

It will be appreciated that the filter 15 may be of any suitable type, or may be omitted. Similarly, any suitable kind of electronic controller may be used.

Further, while the Figures show the invention connected to an AC supply via a rectifier, it will be appreciated that it could equally well be applied to a system to provide a source of electrical power at the principal voltage terminals. The power converter can be any of those shown in FIGS. 2 to 4. Clearly, the voltage terminals 5, 6 will be voltage output terminals, with a load connected to them.

In such a system, the power may be derived from a mechanical energy source to supply the principal voltage output, the DC energy store, or both. The principal voltage output may be supplied from the DC energy store (rotor stationary), or from the DC energy store and the mechanical energy source. The machine may also operate as a motor, driven from the DC energy store, even while the system is providing a DC output at the principal voltage terminals. Where the power converter of FIG. 4 is used, continuous generation to provide a DC output would involve using switch 12' to establish a current, and then diodes 13 and 113 to provide current to the principal voltage terminals.

We claim:

1. A switched reluctance electrical machine system having a switched reluctance machine, a rechargeable DC energy store and principal voltage terminals connectable to an external power source for charging of the energy store, wherein the switched reluctance machine includes a rotor, a stator and windings, said windings including at least two closely-coupled coils and a power converter for controlling current flow in said windings, said power converter having first and second circuit, said first circuit containing a first of said closely-coupled coils and said principal voltage terminals and said second circuit containing a second of said coils and said energy store, a first electronic switching arrangement being connected in series with the coil in said first circuit and a second electronic switching arrangement being connected in series with the coil in said second circuit, an electronic controller being operative to control said electronic switching arrangements of said power converter so that, in the first operational mode, current flows in one direction in the coils during normal machine operation, whereas, in the second operation mode, current flows in the coils in the opposite direction to charge the energy store from an external power source.

2. A switched reluctance electric machine system as claimed in claim 1 wherein each said electronic switching arrangement comprises a switch and a diode connected in parallel.

3. A switched reluctance electrical machine system as claimed in claim 2 wherein at least one of said first and second circuits includes a further switch and a diode connected in parallel and then connected in series with said coil.

4. A switched reluctance electric machine system as claimed in claim 3, wherein two further diodes are included.

5. A switched reluctance electrical machine system as claimed in claim 1, wherein said closely-coupled coils include at least one further coil, and said power converter has a corresponding further circuit containing said further coil and a further DC energy store.

6. A switched reluctance electric machine system as claimed in claim 1, wherein said coils comprise two closely-coupled coils wound as a bifilar winding.

7. A switched reluctance electric machine system as claimed in claim 6, wherein said coil with the lower number of turns is wound as several coils connected in parallel.

8. A switched reluctance electric machine system as claimed in claim 1, wherein said electronic controller operates in response to signals from a rotor position sensing means when said rotor is rotating.

9. A switched reluctance electric machine system as claimed in claim 1, wherein said electronic controller operates in response to signals from a current sensing means.

10. A switched reluctance electric machine system as claimed in claim 1, wherein said machine acts as a motor, and a principal voltage supply is connected to said principal voltage terminals.

11. A switched reluctance electric machine system as claimed in claim 10, wherein said first circuit includes said principal voltage supply terminals and means for providing said principal voltage supply from an AC supply.

12. A switched reluctance electric machine system as claimed in claim 10, wherein said second circuit includes a filter to smooth the current into and out of said DC energy store.

13. A switched reluctance electric machine system as claimed in claim 10, wherein said motor is driven from said principal voltage supply.

14. A switched reluctance electric machine system as claimed in claim 10, wherein said motor is driven from said DC energy store.

15. A switched reluctance electric machine system as claimed in claim 10, wherein said DC energy store is charged from said principal voltage supply while said motor is being driven from said principal voltage supply.

16. A switched reluctance electric machine system as claimed in claim 10, wherein said DC energy store is charged from said principal voltage supply while said rotor is stationary.

17. A switched reluctance electric machine system as claimed in claim 10, wherein mechanical energy from said rotor is converted into electrical energy which is stored in said DC energy store.

18. A switched reluctance electric machine system as claimed in claim 1, wherein said machine acts as a generator, and said principal voltage terminals are for a principal voltage output.

19. A switched reluctance electric machine system as claimed in claim 18, wherein said first circuit includes said principal voltage output terminals.

20. A switched reluctance electric machine system as claimed in claim 18, wherein said generator operates from a mechanical energy source to supply said principal voltage output.

21. A switched reluctance electric machine system as claimed in claim 18, wherein said generator operates from a mechanical energy source to supply said DC energy store.

22. A switched reluctance electric machine system as claimed in claim 18, wherein said principal voltage output is supplied from said DC energy store.

23. A switched reluctance electric machine system as claimed in claim 18, wherein said generator is driven from said DC energy store.

24. A switched reluctance electric machine system as claimed in claim 1, wherein said DC energy store comprises a battery.

* * * * *